Dec. 11, 1962  R. V. WERNER  3,068,469
IONOSPHERIC REFRACTION CORRECTION TECHNIQUE
Filed Oct. 22, 1958  2 Sheets-Sheet 1

INVENTOR.
Robert V. Werner
BY

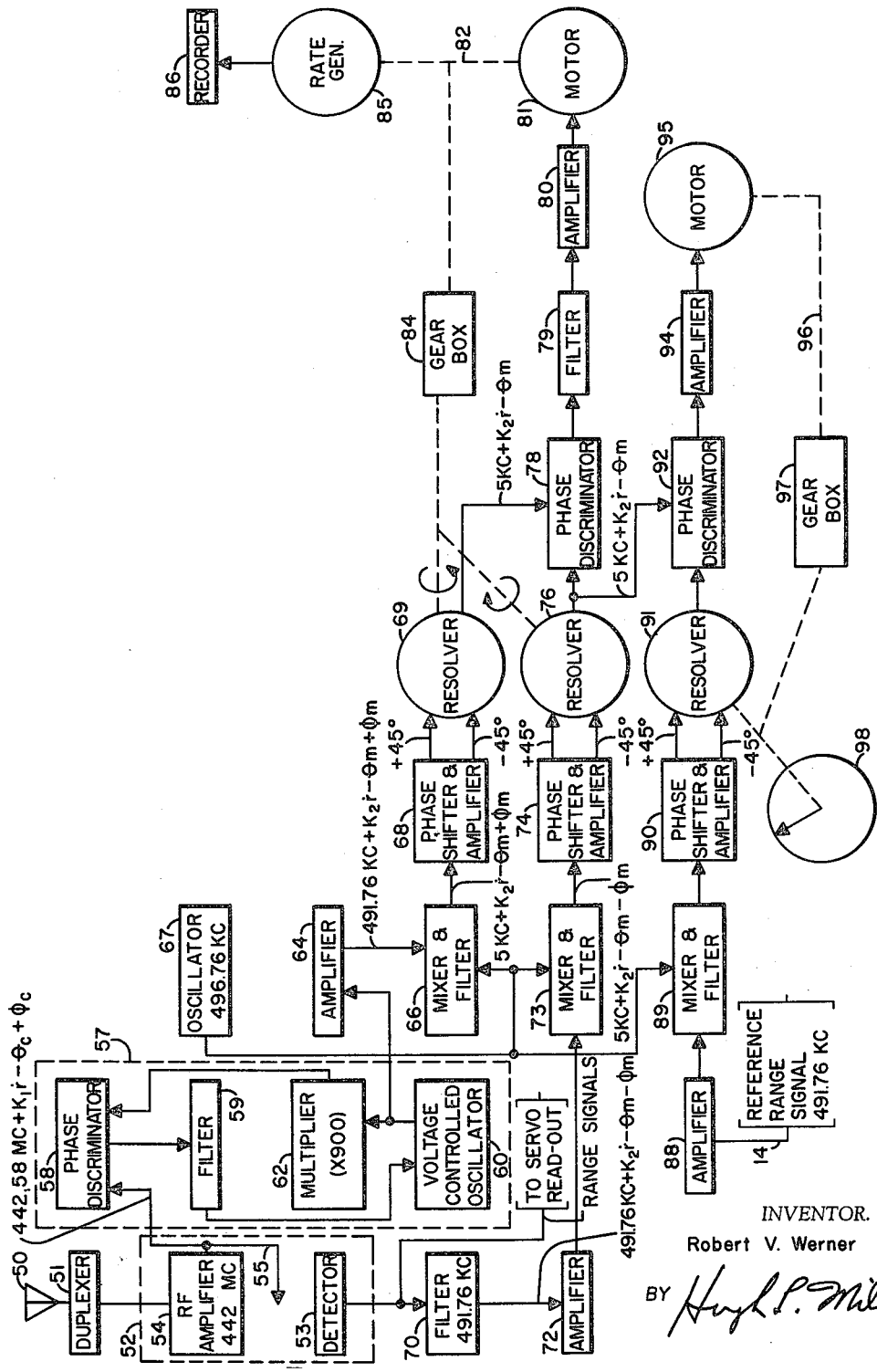

United States Patent Office 3,068,469
Patented Dec. 11, 1962

3,068,469
IONOSPHERIC REFRACTION CORRECTION
TECHNIQUE
Robert V. Werner, La Mesa, Calif., assignor to Cubic Corporation, San Diego, Calif., a corporation of California
Filed Oct. 22, 1958, Ser. No. 768,997
9 Claims. (Cl. 343—9)

The present invention relates to an ionospheric refraction correction technique, and, more particularly, to an ionospheric refraction correction technique for use with an electronic slant range determining unit which measures the phase delay incurred in a signal transmitted to and returned from a target vehicle located within the ionosphere.

In a co-pending U.S. application for patent, entitled "A Sequence Spatial Coordinate Determining System," Serial No. 737,446, to R. V. Werner, Walter J. Zable, and William J. Thompson, filed May 23, 1958, a system embodying three separate slant range measuring units was disclosed, including their sequenced operation with a single target-borne transponder. As was pointed out in detail in that application for patent, the cumulative phase shift incurred in a signal of known constant velocity traveling through the atmosphere is a direct function of the distance traveled by the wave. The slant range was measured essentially by determining the phase delay incurred in a signal transmitted from the ground, received by the transponder, and retransmitted back to the ground.

The disclosed system was capable of acquiring extremely accurate tracking data, on the order of several feet in 100 miles, but only so long as the target vehicle remained in the atmosphere, that is, did not enter the ionosphere. This is true since R-F energy is merely attenuated in traveling through the atmosphere and was, in the prior-noted system, assumed to travel with a velocity equal to light in a vacuum which did not introduce appreciable error in the distance measurements. However, R-F energy experiences a highly complex refraction when propagated through the ionosphere, the refraction varying primarily as a function of its frequency. Hence, the prior assumption that R-F energy travels at the velocity of light in a vacuum cannot be applied when ionospheric travel is encountered without introducing serious errors in the slant range readings.

The ionosphere generally begins at about 25 miles above the surface of the earth and is primarily composed of highly rarified air whose particles exist in an ionized state, caused principally by ultra-violet rays and, to a lesser extent, by charged particles emitted by the sun. It includes several layers, i.e., D layer, E layer, $F_1$ layer, $F_2$ layer, etc., which partially reflect radio energy and whose heights and ionization intensities vary greatly with season and time of day.

Signals transferred from the ground into the ionosphere for vehicle tracking purposes undergo this ionospheric refraction from the time they leave the atmosphere until their return to the atmosphere from the vehicle transponder. Now the magnitude of this refraction is a highly-variable quantity depending, as noted above, on the degree of ionization, the distance traveled through the ionosphere, in turn depending upon the ionosphere's absolute height above the earth's surface at the time of signal transmission, the elevation angle of the target vehicle from the ground antennas, etc. Also, the magnitude of error introduced into the distance data derived by phase delay measurement without accounting for the ionospheric refraction properties adds a high degree of uncertainty as to the accuracy of the data, since range inaccuracies of several hundred or more feet per hundred miles may be encountered. Accordingly, the prior-disclosed system, although entirely suitable and adequate for atmospheric tracking, would be wholly incapable of maintaining its normal accuracy capabilities when employed for tracking vehicles traveling into and through the ionosphere.

The present invention, on the other hand, deals with a technique capable of completely eliminating all errors caused by ionospheric refraction from distance carrying phase delay information. Accordingly, extremely accurate distance information may be derived on the ground of absolute vehicle position during travel into and beyond the ionosphere. This technique is embodied, for the purposes of simplicity, within the structural framework of the prior-noted application for patent and the principle of its operability rests upon a mathematical derivation of considerable complexity which is set forth later.

In essence, it can be shown that if one signal, say a range signal, is modulated on a carrier signal and the two transmitted into the ionosphere, the carrier signal will experience a smaller phase delay than would normally occur during similar travel through the atmosphere, the difference being due to ionospheric refraction. On the other hand, the modulating signal will experience a phase delay greater than normal, again due to the same refraction. The magnitudes of the respective decrease and increase in carrier and modulating signal phase delays will be directly proportional to their frequency ratio. That is, for example, if the carrier signal frequency is an integral multiple of the modulating signal frequency, then its phase delay modification due to ionospheric travel will be the same multiple of the phase delay modification produced in the modulating signal. This key, unexpected result is made use of by the circuitry constituting this embodiment of the present invention.

In particular, the present embodiment requires coherency between the carrier and the highest range modulating signal, that is, the carrier signal frequency must be an integral multiple of the range signal frequency. This is accomplished by multiplying the 491.76-kc. highest range signal frequency by a factor of 960 to form a carrier signal having a frequency of 472.089 mc. In the course of the multiplication, the range signals are frequency-modulated on the carrier signal for transmission to the target. The transponder, located in the target vehicle, is arranged to maintain a predetermined frequency correlation between the received ground produced carrier signal frequency and its output carrier signal frequency. This is accomplished by servoing the transponder signal frequency to a value which is 29.506-mc. lower than the ground carrier signal, or to 442.58 mc., which is 900 times the originating 491.76-kc. signal frequency from which the ground carrier signal was initially derived.

Then, in the ground station, the carrier signal received from the transponder is divided by a factor of 900 so that its frequency, including Doppler frequency offset due to target velocity, and phase delay due to atmospheric slant range will be exactly equal to the same factors in the 491.76-kc. highest range signal. The only difference, then, between this carrier-derived signal and the range signal will be an identical phase decrease and increase, respectively, due to ionospheric refraction. This phase difference is then eliminated from both by passing them through a pair of respective linear phase shift resolvers and servoing the resolver shaft positions in opposite directions until signals appearing on their respective output terminals are exactly equal in phase. With the servoing accomplished, the ionospheric refraction phase error has been eliminated from both signals since the two resolvers will act to add and subtract equal phase delays corresponding to that introduced by the ionospheric refraction to the passed signals. Accordingly, either may then be employed for determining target range in the servo readout section of the slant range determining system, of the type, for example, described in the referred to application for patent.

One final feature of the system according to the present invention is obtained by having coherent ground-transmitted and transponder-return carrier signals. This enables slant range velocity to be measured, based on measuring the frequency shift of the received transponder carrier signal frequency. This is possible, since its generated frequency will always be a predetermined ratio of the ground-produced carrier signal.

Accordingly, the principal object of the present invention is to provide an electronic system capable of measuring slant range distance to a target vehicle located in the ionosphere by phase comparison techniques and eliminating phase errors due to ionospheric refraction effects.

Another object of the present invention is to provide an electronic system for correcting slant range measurements taken of a vehicle traveling through the ionosphere due to effects of ionospheric refraction.

Still another object of the present invention is to provide electronic circuitry for use with a slant range measuring system wherein tracking data derived by the system of a vehicle traveling through the ionosphere is automatically and continuously corrected for all ionospheric refraction effects.

A further object of the present invention is to provide a vehicle tracking system measuring phase delay incurred between a ground-transmitted signal and one returned from the vehicle for determining slant range to the vehicle, and additionally capable of automatically correcting any phase error in the received signal due to ionospheric refraction effects caused by the signal traveling through any portion of the ionosphere.

A still further object of the present invention is to provide an electronic tracking system employing phase comparison techniques capable of tracking target vehicles into the ionosphere without loss of tracking accuracy owing to signal phase refraction by the ionosphere.

Still another object of the present invention is to provide a system for tracking a vehicle into the ionosphere using phase comparison techniques wherein the phase delay in a carrier signal and a range signal modulated on the carrier signal are respectively decreased and increased equivalent amounts owing to ionospheric refraction effects, and correcting the range signal phase delay by effectively adding a phase delay corresponding to the equivalent amount of phase increase in the carrier signal.

A further object of the present invention is to provide a slant range distance-measuring system whose ground-transmitted carrier signal and transponder-return signal are coherent, hence enabling slant range velocity of the target vehicle carrying the transponder to be determined by measuring the frequency shift in the transponder-return signal.

Other objects, features and attendant advantages of the present invention will become more apparent to those skilled in the art as the following disclosure is set forth including a detailed description of a preferred embodiment of the invention as illustrated in the accompanying sheets of drawings, in which:

FIGURE 3 is a block diagrammatic representation of a portion of the ground-based servo readout section wherein the output range data is corrected for ionospheric refraction effects.

Figure 1:
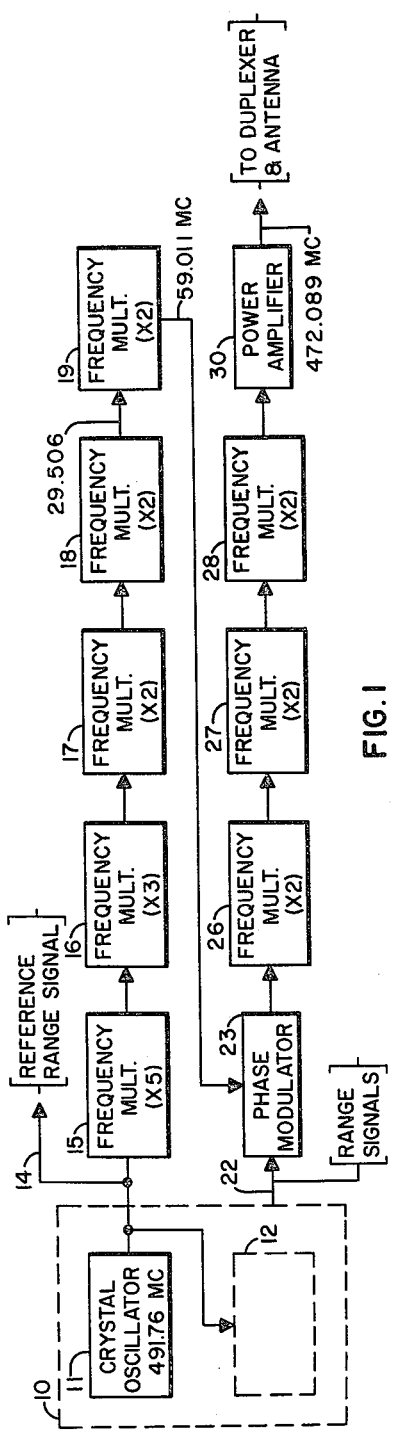
FIGURE 1 is a block diagrammatic representation of a portion of a ground-based transmitter section.

The physical principle upon which the system constituting the present invention is based is most readily established by a mathematical derivation. In particular, consider an amplitude-modulated signal, which, for the purposes of proof is exactly equivalent in results to a frequency-modulated signal as actually used by the system of the present invention:

$$M(t) = A_c(1 + kA_m \cos \omega_m t) \cos \omega_c t \quad (1)$$

where $A_c \cos \omega_c t =$ carrier
$A_m \cos \omega_m t =$ modulated wave $\quad (1a)$
$k =$ proportionality factor For purposes of mathematical simplicity, Equation 1 may be written as:

$$M(t) = (1 + \cos \omega_m t) \cos \omega_c t \quad (2)$$

or $$M(t) = \cos \omega_c t + \tfrac{1}{2} \cos (\omega_c + \omega_m)t + \tfrac{1}{2} \cos (\omega_c - \omega_m)t \quad (3)$$

Equation 3 can thus be construed as the total electromagnetic transmission. In order to further simplify the remaining mathematical derivation only a one-way path will be used since this case can be readily extended to the practical case of two-way transmission, the only difference being the actual magnitude of correction.

The received signal can be given as follows:

$$M_r(t) = \cos\left(\omega_c t - \frac{\omega_c r}{v_c}\right) + \frac{1}{2} \cos\left(\omega_+ t - \frac{\omega_+ r}{v_+}\right) + \frac{1}{2} \cos\left(\omega_- t - \frac{\omega_- r}{v_-}\right) \quad (4)$$

where $r =$ true range
$\omega_+ = \omega_c + \omega_m$
$\omega_- = \omega_c - \omega_m$
$v_i =$ velocity of propagation at radar frequency $\omega_i$ Now, the phase velocities are given as:

$$v_i = \frac{c}{n_i} \quad (5)$$

where $n_i$ is the index of refraction at the frequency $\omega_i$ and $c$ is the vacuum velocity. Further, the index of refraction for the ionosphere is given by:

$$n_i = \sqrt{1 - \frac{80.6N}{f_i^2}} = \sqrt{1 - \frac{2k}{f_i^2}} \quad (6)$$

Then, by expansion, $$(1-x)^{\frac{1}{2}} = 1 - \tfrac{1}{2}x, \quad x \ll 1 \quad (7)$$

and $$x = \frac{2k}{f_i^2} \ll 1 \quad (8)$$

leads to the following general form:

$$n_i = 1 - \frac{k}{f_i^2} \quad (9)$$

Then, for the three frequencies, $f_c$, $f_+$ and $f_-$, there is obtained:

$$n_c = 1 - \frac{k}{f_c^2}$$

$$n_+ = 1 - \frac{k}{f_+^2} = 1 - \frac{k}{(f_c + f_m)^2} = 1 - \frac{k}{f_c^2} + \frac{2kf_m}{f_c^3}$$

$$n_- = 1 - \frac{k}{f_-^2} = 1 - \frac{k}{(f_c - f_m)^2} = 1 - \frac{k}{f_c^2} - \frac{2kf_m}{f_c^3} \quad (10)$$

which lead to the expression:

$$\Phi_i = \frac{\omega_i r}{v_i} = \frac{\omega_i r n_i}{c} = \frac{\omega_i r}{c}\left(1 - \frac{k}{f_i^2}\right) \quad (11)$$

Thus, from all of the foregoing, Equation 4 can be written as:

$$M_r(t) = \cos\left(\omega_c t - \frac{\omega_c r}{c} + \frac{\omega_c rk}{cf_c^2}\right)$$
$$+ \frac{1}{2}\cos\left(\omega_c t - \frac{\omega_c r}{c} + \frac{\omega_c rk}{cf_c^2} - \frac{2\omega_c rkf_m}{cf_c^3}\right)$$
$$\cos\left(\omega_m t - \frac{\omega_m r}{c} + \frac{\omega_m rk}{cf_c^2} - \frac{2\omega_m rkf_m}{cf_c^3}\right)$$
$$- \frac{1}{2}\sin\left(\omega_c t - \frac{\omega_c r}{c} + \frac{\omega_c rk}{cf_c^2} - \frac{2\omega_c rkf_m}{cf_c^3}\right)$$
$$\sin\left(\omega_m t - \frac{\omega_m r}{c} + \frac{\omega_m rk}{cf_c^2} - \frac{2\omega_m rkf_m}{cf_c^3}\right)$$
$$+ \frac{1}{2}\cos\left(\omega_c t - \frac{\omega_c r}{c} + \frac{\omega_c rk}{cf_c^2} + \frac{2\omega_c rkf_m}{cf_c^3}\right)$$
$$\cos\left(\omega_m t - \frac{\omega_m r}{c} + \frac{\omega_m rk}{cf_c^2} + \frac{2\omega_m rkf_m}{cf_c^3}\right)$$
$$+ \frac{1}{2}\sin\left(\omega_c t - \frac{\omega_c r}{c} + \frac{\omega_c rk}{cf_c^2} + \frac{2\omega_c rkf_m}{cf_c^3}\right)$$
$$\sin\left(\omega_m t - \frac{\omega_m r}{c} + \frac{\omega_m rk}{cf_c^2} + \frac{2\omega_m rkf_m}{cf_c^3}\right) \quad (12)$$

Letting $$\alpha = \omega_c t - \frac{\omega_c r}{c} + \frac{\omega_c rk}{cf_c^2}$$
$$\beta = \frac{2\omega_c rkf_m}{cf_c^3} = \frac{2\omega_m rk}{cf_c^2}$$
$$\gamma = \omega_m t - \frac{\omega_m r}{c} + \frac{\omega_m rk}{cf_c^2}$$
$$\delta = \frac{2\omega_m rkf_m}{cf_c^3} \quad (13)$$

Equation 12 can be written as:

$$M_r(t) = \cos\alpha + \tfrac{1}{2}\cos(\alpha-\beta)\cos(\gamma-\delta)$$
$$- \tfrac{1}{2}\sin(\alpha-\beta)\sin(\gamma-\delta)$$
$$+ \tfrac{1}{2}\cos(\alpha+\beta)\cos(\gamma+\delta)$$
$$+ \tfrac{1}{2}\sin(\alpha+\beta)\sin(\gamma+\delta)$$

Expanding Equation 14 and contracting after cancellation gives:

$$M_r(t) = \cos\alpha + \cos\alpha\cos\delta\cos(\gamma-\beta)$$
$$+ \sin\alpha\sin\delta\cos(\gamma-\beta) \quad (15)$$

From Equation 15 it can be seen that the modulation appears to be compromised by the angle $\delta$. However, $\delta$ is still very small for maximum ranges, say 2000 nautical miles, so that $$M_r(t) = [1 + \cos(\gamma-\beta)]\cos\alpha \quad (16)$$

and $$\gamma - \beta = \omega_m t - \frac{\omega_m r}{c} - \frac{k\omega_m r}{cf_c^2} \quad (17)$$

Equation 17 shows that the modulation phase lag is increased by the amount of the last term, while the last term in the expression for $\alpha$ in Equation 13 indicates that the carrier phase lag is decreased by the amount of its last term, $$\frac{\omega_c rk}{cf_c^2}$$

The difference in magnitude of the two terms lies only in $\omega_m$ and $\omega_c$, the respective modulating and carrier signal frequencies. This means, then, that the amount of phase increased an decerase in the two signals, owing to ionospheric refraction, will be exactly proportional to the two respective signal frequencies. Accordingly, if the frequencies of these two signals are brought to the same value, that is by either multiplying the modulating signal frequency up to the carrier signal frequency or dividing the carrier signal frequency down to the modulating signal frequency, the range-caused phase shift in the two will be identical, while the ionospheric-caused phase shift will be equal but of opposite polarity.

This phase shift error may then be removed from either or both signals, as is done by the FIGURE 3 circuitry, and described in conjunction therewith, by taking the phase difference between the two signals and effectively dividing the resulting phase difference by two. The resulting divided value will then represent the phase error in each signal caused by ionospheric refraction. Then, by effectively adding the divided phase shift value to the range signal and subtracting it from the carrier-derived signal, the phase shift of both signals is corrected for ionospheric travel.

In order to better appreciate and understand the device according to the present invention, a brief review is herewith set forth of the basic operation of a DME or slant range measuring system. First of all, a series of five range signals, varying in frequency from 491.76 kc. to 192 c.p.s., are modulated on a carrier signal and the resulting modulated signal transmitted for receipt by the airborne transponder. The transponder demodulates the received carrier signal, remodulates the range signals on a new carrier signal whose frequency differs from the ground-received carrier signal, and then transmits the new modulated carrier signal. The ground receiver unit receives the transponder signal, demodulates it, and passes the demodulated range signals into a servo readout section. The servo readout acts to compare the phase shifts between the original or reference series of range signals produced at the ground with those received from the transponder through the receiver, and produces an unambiguous slant range measurement, based on the series of measured phase shifts, which represents the distance of the target vehicle from the ground station.

Now, as pointed out in detail in the aforementioned application for patent, the precision to which the phase difference between a pair of signals can be measured is relatively independent of their wavelength. This means, then, that in order to achieve extremely accurate range information, a very short wavelength signal should be employed as, for example, the highest range signal frequency of 491.76 kc. However, as will be appreciated, a signal of this frequency, which corresponds to a 2000-foot wavelength, will undergo an indeterminate number of complete cycles of phase shift in traveling to the transponder and back. Accordingly, any phase measurement made between this data and reference signals will be ambiguous, since the particular number of complete cycles of phase delay incurred in its travel will not be known. Hence, the remaining range signals are chosen to have increasingly longer wavelengths and each is individually employed by the servo readout to resolve the basic ambiguity in the next higher frequency range signal. That is, each range signal determines which cycle, relative to its own longer wavelength, is being measured in the next higher frequency channel. This process continues in the servo readout until a final range signal is employed whose wavelength provides the maximum unambiguous tracking distance capabilities of the entire system. In the system under discussion, the 192–c.p.s. lowest range signal frequency provided an approximately 200-mile tracking capability of the system.

Referring now to the drawings, wherein the same circuit elements are given the identical numerical designation throughout the several figures there is shown in FIGURE 1 a portion of the transmitter section of a distance measuring equipment, or DME, as modified from the previously disclosed transmitter section set out in the referred to patent application, Serial Number 737,446, and described briefly above. These modifications serve to introduce correlation and coherency techniques into the circuitry, as particularly required for the incorporation of ionospheric refraction correction techniques. In particular, the range signal generator, which is indicated by the dotted box at 10, includes crystal oscillator 11, producing the previously-noted 491.76-kc. frequency signal on its output terminal, which is applied externally to a frequency multiplier 15, providing a frequency multiplication of 5, and to a line 14 for later use in the circuitry of FIGURE 3. The oscillator 11 output signal is also applied to the remaining portion of the range signal generator unit, indicated at 12, where it is counted down by a number of serially connected binary flip-flop stages to produce the remaining range signals. All of the range signals, including the 491.76-kc. signal, appear on an output conductor 22, and will, in a manner to be explained, be modulated on the carrier signal for transmission to the target vehicle.

The output signal of frequency multiplier 15 is applied serially through frequency multipliers 16, 17, 18 and 19, producing respective frequency multiplications of 3, 2, 2 and 2, to one input terminal of a phase modulator 23. The range signals on conductor 22 coming from range generator 10 are applied to the other input terminal of modulator 23, whose output signal, in turn, is coupled serially through frequency multipliers 26, 27 and 28, each offering a frequency multiplication of two. Finally, the output signal of frequency multiplier 28 is amplified by a power amplifier 30 and is then coupled through a duplexer to an antenna, neither being herein specifically illustrated, for transmission to the target vehicle.

To incorporate the present device into the previously described slant range measuring system, it is necessary to modify, in one particular aspect, the detailed structure shown in the prior-noted application, and the circuitry of FIGURE 1 illustrates in block schematic form the required ground-based equipment modification. The particular function of the FIGURE 1 circuitry is to derive the carrier signal from the Very Fine range signal, produced by crystal oscillator 11, in contrast to employing a separate signal source as was done in the previous application. This means, then, that the carrier signal frequency will always be a direct multiple of the highest range signal frequency, and, therefore, will be coherent therewith.

Frequency multipliers 15, 16, 17, 18 and 19 offer a combined frequency multiplication of 5×3×2×2×2, or 120 times to the incoming signal frequency of 491.76-kc. from oscillator 11. Hence the frequency of the signal entering modulator 23 will be 59.011 mc. Each multiplier shown in this and other figures may be formed by an over-driven or class C type of amplifier having an appropriate L-C filter in its output circuit which is tuned to the desired harmonic or multiple of the input signal. The filter acts to thereby extract the multiplied input signal from the highly-distorted output waveform of the amplifier.

Modulator 23 serves to phase modulate the five range signals appearing on lead 22 on the multiplied signal output of multiplier 19, and the carrier component is then frequency multiplied by multipliers 26, 27 and 28 to its final frequency of 472.089 mc. This signal is then power amplified by amplifier 30 and transmitted through a duplexer to an antenna, neither of which is shown, for transmission to the transponder in the target vehicle. It will be noted that the final carrier signal is 960 times the frequency of the oscillator 11 output signal and further, any frequency variations of the oscillator 11 signal will be directly reflected as frequency variations in the carrier signal, but multiplied by a factor of 960.

Figure 2:
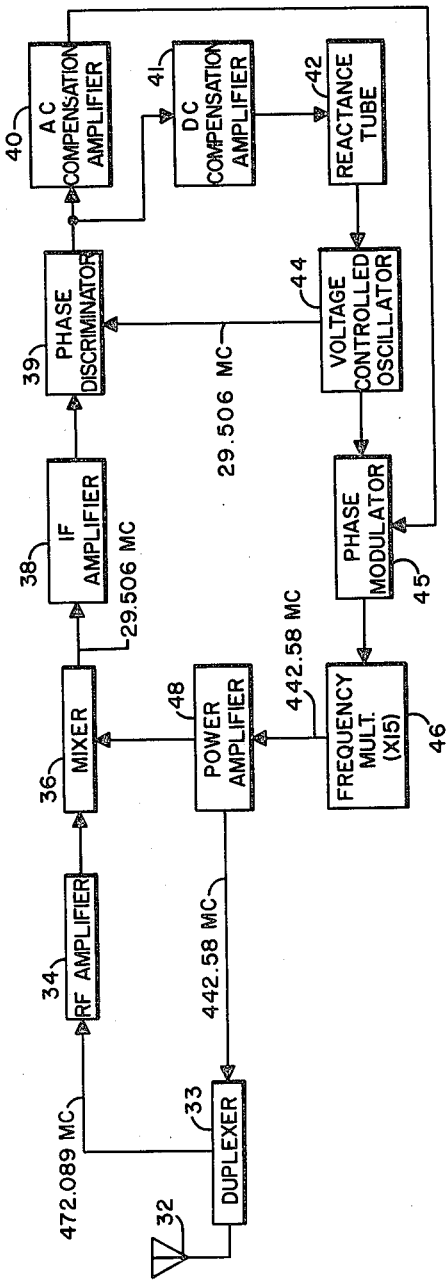
FIGURE 2 is a block diagrammatic representation of the target-borne transponder required for use with the ground-based system of the present invention.

Referring now to FIGURE 2, there is illustrated in block schematic form, the transponder circuitry which is preferably employed with the ground transmitted signal as modulated in accordance with the techniques described in FIGURE 1. As such, the transponder circuitry differs in detail from that described in the earlier noted application for patent. In particular, the ground-transmitted signal is received on an antenna 32, and from there taken through a duplexer 33 to the input terminal of an R-F amplifier 34. The output signal of R-F amplifier 34 is applied to one input terminal of a mixer 36, whose output signal, in turn, is applied to an I-F amplifier indicated at 38. The output signal of I-F amplifier 38 is taken to one input terminal of a phase discriminator 39 whose output signal, in turn, is applied both to an A.-C. compensation amplifier 40 and to a D.-C. compensation amplifier 41. The output signal of D.-C. compensation amplifier 41 serves to control the reactance value of a reactance tube 42, in turn controlling the output signal frequency of a voltage-controlled oscillator 44. The output signal of oscillator 44 is applied to the other input terminal of phase discriminator 39 and also to one input terminal of a phase modulator 45. The output signal from A.-C. compensation amplifier 40 is applied to the other input terminal of phase modulator 45, the output signal of modulator 45 going through a frequency multiplier 46 having a multiplication factor of 15 to the input terminal of the power amplifier 48. The output signal of amplifier 48 is applied to the other input terminal of mixer 36 and also to duplexer 33 for routing to antenna 32 for retransmission to the ground.

In operation, the transponder will receive the ground-transmitted carrier signal of 472.089-mc. frequency on its antenna 32, which, in turn, is coupled through duplexer 33 for amplification by R-F amplifier 34. The output carrier signal of the transponder is 442.58 mc., produced in a manner to be shortly shown, which is passed through power amplifier 48 and duplexer 33 to antenna 32 for radiation to the ground. A portion of the amplifier 48 output energy is mixed with the incoming signal in mixer 36 and their signal frequency difference, or 29.506 mc., which is 60 times the range signal frequency of 491.76 kc., is amplified by I-F amplifier 38 and passed to one input terminal of phase discriminator 39. Discriminator 39, D.-C. compensating amplifier 41 and reactance tube 42 provide a servoing loop to control the output signal of oscillator 44 to the stated 29.506-mc. figure. Specifically, the output signal of discriminator 39 contains a D.-C. component representing the incoming carrier signal frequency offset from the 29.506-mc. value and additionally includes the various range signals. D.-C. amplifier 41 amplifies only the D.-C. component which, in turn, controls the output frequency of oscillator 44 to the stated value.

The range signals coming from discriminator 39 are selectively amplified by A.-C. compensation amplifier 40. This may be accomplished most easily by inserting a series of resonant circuits respectively tuned to the series of range signal frequencies in either the input or output circuit of the amplifier. Then, owing to the action of phase modulator 45, the range signals will be phase modulated on the 29.506-mc. signal of voltage-controlled oscillator 44. The phase modulated signal from modulator 45, after having its frequency multiplied 15 times by multiplier 46, will constitute the transponder output signal at the assumed 442.58-mc. frequency. As will be appreciated, multiplier 46 may actually comprise a number of separate multipliers, as in FIGURE 1, whose total multiplication product is fifteen.

Referring now to FIGURE 3, there is illustrated in block diagrammatic form that portion of the present system which both provides correction of the range signal data and then presents a readout or indication of slant range based on this corrected data. As will be soon apparent, this correction is applied only to the 491.76-kc. or Very Fine readout channel of the servo readout as the remaining readout channels contribute nothing to the ultimate system accuracy other than resolve ambiguities in this Very Fine channel reading. In the figure, the ground-based antenna 50 received signal is coupled through a duplexer 51 into a receiver section, indicated generally at 52, only an R-F amplifier 54 and a detector 53 being therein illustrated as they only pertain to the present invention. The output signal of amplifier 54 is applied to a frequency divider, indicated within the dotted box 57, and also to a lead 55, shown going from the output terminal of amplifier 54 to the remaining portion of the receiver.

The output signal from amplifier 54 is applied to one input terminal of a phase discriminator 58 within divider 57, whose output signal, in turn, is coupled through a filter 59 to the input terminal of a voltage-controlled oscillator 60. The output signal of oscillator 60 comprises the output signal of the divider and is, within the divider, applied to the input terminal of a multiplier 62, furnishing a frequency multiplication of 900, and preferably formed of a series of individual multiplying circuits of the type shown in FIGURE 1. The series of such individual multipliers may have respective individual multiplications of 5, 5, 3, 3, 2 and 2, which when multiplied together yield the desired multiplication figure of 900. The output signal of multiplier 62 is applied to the other input terminal of discriminator 58, to complete the circuit connections of divider 57.

The divider output signal is amplified by an amplifier 64 and applied to one input terminal of a mixer and filter combination 66. The other input terminal of mixer 66 receives the 496.76-kc. output signal of an oscillator 67, while its output terminal is connected to the input terminal of a phase shifter and amplifier 68. The pair of output signals from phase shifter 68, having respective +45-degree and −45-degree phase relationships with the phase shifter input signal, are coupled to the two stator windings of a resolver, shown in diagrammatic form at 69.

The range signals coming from receiver 52 and produced by demodulating the incoming carrier signal as by detector 53, are applied through a 491.76-kc. filter 70 to extract the Very Fine or VF channel data signal of 491.76 kc. This data signal, containing the VF channel distance information, is applied through an amplifier 72 to one input terminal of another mixer and filter circuit 73. The other input terminal of mixer 73 receives the output signal from oscillator 67 and its output signal is applied through a phase shifter and amplifier combination 74 to the two stator windings of another resolver 76, also shown in block diagrammatic form.

Now, the output signals from resolvers 69 and 76, derived from their respective rotor winding circuits, are applied to the two input terminals, respectively, of a phase discriminator 78. The output signal of discriminator 78 is applied serially through a filter 79, an amplifier 80, to the energizing windings of a motor 81, shown schematically, whose shaft 82, in turn, is geared down in a gear box, indicated schematically at 84 to drive the two rotors of resolvers 69 and 76, at the same speed reduction or gear-down ratio, but in opposite directions, as indicated by the arrows. Finally, a rate generator, indicated schematically at 85, is coupled to shaft 82 of motor 81, and its output signal applied to a recorder, shown schematically at 86.

Finally, the reference range signal of 491.76 kc., appearing on line 14 in FIGURE 1, is applied through an amplifier 88 to one input terminal of another mixer and filter 89, which receives, on its other input terminal, the output signal of oscillator 67. The output signal from mixer 89 is applied through a phase shifter and amplifier 90 across the two stator windings of still another resolver 91, whose output signal is applied to one input terminal of a phase discriminator 92. The output terminal of resolver 76 is connected to the other input terminal of discriminator 92, and the discriminator output signal is coupled through an amplifier 94 to drive a motor 95. The shaft 96 of motor 95 is coupled through a gear box 97 to drive the rotor of resolver 91 and a dial indicator, indicated schematically at 98.

The principal function of the FIGURE 3 circuitry is to provide a VF or very fine channel reading for the servo readout which has been corrected for ionospheric refraction errors introduced by any travel of the carrier and range signals through it.

It is intended that the circuit shown in this FIGURE 3 be employed independently from the normal system servo readout, and the reading obtained by this circuit, unlike the normal VF channel reading in the servo readout, represents a Very Fine channel range reading which has been corrected for ionospheric refraction effects. This substitution of data will be permissible since, as stated earlier, the ultimate system accuracy is determined fully by the Very Fine channel reading with the other channels serving to provide ambiguity resolution for its data. Accordingly, the reading obtained by the FIGURE 3 circuitry may be substituted directly for the Very Fine reading obtained in the servo readout as disclosed in the prior-noted application, and the over-all reading thus obtained will be highly accurate since ionospheric refraction effects will have been eliminated from it.

In considering now the operation of the FIGURE 3 circuitry, the output signal of R-F amplifier 54 comprises an amplified carrier signal of the transponder signal center frequency of 442.58 mc., phase modulated by the range signals, including the Very Fine or 491.76-kc. signal, here of interest. Line 55, indicated briefly in the receiver, serves to carry this amplified output signal to the remaining portions of the receiver circuitry where the range signals are demodulated from the carrier and appear, after appropriate amplification, on the output line going to the servo readout unit.

Now, the received carrier signal frequency will be shifted from the transponder-transmitted value owing to the Doppler effect caused by target slant range velocity relative to the ground. The amount of this shift is indicated in the figure by $K_1 \dot{r}$ where $K_1$ can be either positive or negative. In the same way, the Very Fine range signal, appearing as the output signal of filter 70, will also have a frequency offset owing to the Doppler effect, which is designated $K_2 \dot{r}$ in the figure, where $K_1$ and $K_2$ are related by the respective frequency ratio of the carrier to the VF range signals. Also, the carrier and range or modulation signals will experience respective phase lags, $\theta_c$ and $\theta_m$ due to the total distance traveled, from the ground to the transponder and return, and representing true range. The ratio of the $\theta$ terms are also directly related by the carrier and modulation signal frequency ratio.

Finally, the carrier signal will experience a phase lead, $\phi_c$, as derived earlier, during its transmission throughout the ionosphere owing to the ionospheric refraction characteristics, while the range signal will experience a corresponding phase delay, $\phi_m$, during its ionospheric travel. Also, since the amount of refraction afforded a signal is a direction function of its frequency, the magnitudes of $\phi_m$ and $\phi_c$ will be directly related by their frequency ratio.

The function of divider 57 is to compress or divide the carrier signal frequency, including its Doppler shift, down to the point where it corresponds to the frequency of the Very Fine range signal. When this is done, $\theta_c$ will equal $\theta_m$, and $\phi_c$ will equal $\phi_m$, the latter phase angles, as explained previously, being of opposite polarity. The dividing function is performed by servoing voltage-controlled oscillator 60 to where its output signal is exactly 1/900 of the frequency and phase of the incoming carrier signal, or 491.76 kc. Any deviations of the oscillator signal frequency or phase from 1/900 the carrier signal frequency or phase will result, after being multiplied 900 times by multiplier 62, in a D.-C. signal output from the discriminator of a polarity and magnitude sufficient to modify the voltage-controlled oscillator 60 signal frequency until null is re-established. It should also be noted that since in FIGURE 1 the carrier signal was derived from the highest range signal by direct multiplication, any drifts in the crystal oscillator 11 produced range signal will result in corresponding drifts in the carrier signal frequency. Hence, division of the carrier signal by divider 57 will always result in a signal having the same frequency as the range signal, the only difference being in their respective negative and positive ionospheric refraction-caused phase shifts.

The range data and divided carrier signals are mixed with the 496.76-kc. output signals of oscillator 67 in mixer and filter circuits 66 and 73, respectively, and the respective difference frequency signals, $$5 \text{ kc.} + K_2\dot{r} - \theta_m + \phi_m \text{ and } 5 \text{ kc.} + K_2\dot{r} - \theta_m - \phi_m$$

are applied to phase sifter and amplifier circuits 68 and 74, respectively. The two mixing operations serve only to reduce the basic 491.76-kc. signal frequency to the 5-kc. figure, which, as will be appreciated, is necessary for use with conventional resolvers.

Each phase shifting network provides a pair of output signals, one leading and the other lagging its respective input signal by 45°. Now, resolvers 69 and 76 are preferably connected as linear phase shifters; that is, the phase difference produced in an input signal passing through the resolver is a direct, linear function of the resolver rotor shaft displacement. This linear shift characteristic is most readily provided by connecting a series resistor and capacitor across the rotor winding, their values being related such that the capacitive reactance, at the 5-kc. frequency, is equal to the resistor value. The output signal from each resolver is then taken from the resistor and capacitor junction point and the two resulting output signals are compared in phase by discriminator 78.

The circuitry extending from phase discriminator 78, through motor 81 and the feedback action from its shaft and gear box 84 to the pair of resolver shafts, acts to drive the resolver shafts to null, that is, to respective shaft positions where the phases of their output signals entering discriminator 78 are exactly equal. If, for example, a phase unbalance should occur at the discriminator input terminals, an output signal of one or the other polarity, as determined by the direction of phase unbalance, would be produced and subsequently applied through amplifier 80 to motor 81. The subsequent rotation of the motor, through gear box 84, will act to drive the resolver shafts, in opposite directions, to reduce the phase difference and hence the output discriminator signal to zero magnitude. When this null condition is attained, the shaft position of resolver 69 will be displaced an amount corresponding to $-\phi_m$. Hence, the frequency reduced carrier signal passing through resolver 69 will have $\phi_m$ subtracted from it, and will accordingly be equal to $5 \text{ kc.} + K_2\dot{r} - \theta_m$ on the resolver output terminal. In the same way, $\phi_m$ will be added to the range data signal passing resolver 76, hence cancelling out the corresponding phase in the applied signal, with the result that its output terminal signal is also $5 \text{ kc.} + K_2\dot{r} - \theta_m$.

In summary, then, the phase difference between the two channel signals is obtained by effectively subtracting them through the discriminator, and, since the resolver shaft positions are simultaneously driven in opposite directions, one-half of the resulting total error is appropriately combined with each channel reading to thereby correct it.

It will be appreciated, of course, that the particular circuitry and type of motor employed for completing the feedback loop to the resolver shafts is immaterial, as a number of different schemes could be employed. For example, motor 81 may be of a conventional D.-C. variety or a two-phase servo variety. If the latter type is employed, one winding would be continuously energized by a source of alternating current potential and the other winding would be selectively energized for rotation by a corresponding signal, either 90° leading or lagging in phase with the alternating current signal, as produced by a phase modulator receiving both the discriminator output signal and the alternating current signal.

The signals appearing across the output circuits of both resolvers 69 and 76 at null represent the Very Fine channel data signal, carrying phase information, $\theta_m$, relating to the target slant range but which has had the ionospheric refraction phase error eliminated from it. Hence, either signal may be employed for deriving the true or accurate Very Fine channel readout in essentially the manner described in the prior-noted application for patent. In particular, the reference range signal of 491.76-kc. appearing on line 14, shown earlier in FIGURE 1, is reduced in frequency to the 5-kc. value by the operation of mixer and filter 89 in conjunction with the output signal of oscillator 67. This reduced frequency reference signal is passed through resolver 91, after phase shifting and amplification by amplifier 90. Resolver 91 is preferably connected as a linear phase shifter in the manner described for resolvers 69 and 76, and the resulting phase shifted signal is phase compared with the data range signal appearing on the output terminal or resolver 76 in phase discriminator 92. The feedback loop from discriminator 92, including amplifier 94 and motor 95, serves to reduce the discriminator 92 output signal to zero by effectively driving the resolver 91 shaft to a displacement which corresponds exactly to the phase difference, $\theta_m$, between the data and reference range signals.

A dial indicator 98 is shown connected to the shaft of resolver 91 and presents a visual indication of the phase difference and hence the slant range distance reading given by the Very Fine range data. As stated earlier, this reading may be used in lieu of the normal VF channel reading of the complete servo readout unit, as shown in the noted patent application, or the entire channel herein shown may be directly incorporated in the servo readout unit as the Very Fine channel.

The Doppler frequency $K_2\dot{r}$ will be included in the readout value since resolver shaft 91 will be driven by motor 95 at a velocity corresponding to the sum of this Doppler frequency offset and the slant range velocity. Hence, dial indicator 98 will be rotating at a frequency exactly equal to the slant range velocity and Doppler offset frequency and its position at any instant will represent the Very Fine channel distance reading.

As may also be noted, since the transponder carrier signal frequency is effectively servoed to be a predetermined ratio of the ground-transmitted frequency, there will always be frequency coherency between these two carrier signals. Accordingly, any carrier signal frequency shift due to Doppler frequency offset, corresponding to slant range velocity, can be readily determined by observing or measuring the actual frequency difference and comparing it to the theoretical frequency difference. If coherency were not employed, that is, if the transponder carrier signal frequency were independently determined by a separate oscillator in the transponder, for example, as was done in the previously mentioned application for patent, then there would be no way to determine at the ground the precise transponder carrier signal frequency, since Doppler effects and normal transponder oscillator frequency drifts would be indistinguishable. It is, accordingly, evident that slant range velocity or Doppler offset can be measured by the present system owing to the coherency techniques employed.

Accordingly, sufficient information is present in the system according to the present invention for determining slant range velocity in two different ways, as noted above. In one, the rate of the readout resolver shaft 91 rotation may be measured, or the frequency difference between the coherent transponder return signal and the transmitted signal may be measured, after their translation to a mutual frequency. It should additionally be noted that the magnitude of the phase changes in the carrier and modulating signals due to ionospheric travel is a function of the properties of the ionosphere and not of vehicle motion and takes place whether slant range velocity is present or not. On the other hand, slant range velocity of the vehicle introduces a frequency, not phase change, in the ground received signal by reason of the Doppler effect. The readout technique as described, acts to separate these two different effects in that phase differences due to ionospheric travel is cancelled out while frequency differences due to slant range velocity appear as a rotation of the resolver shaft. Finally, consider rate generator 85 and the meaning of its output signal recording, as made by recorder 86. The rate generator output signal will represent the change or derivative of the motor 81 shaft displacement and hence, since motor 81 is driven to equal $\theta_m$ at all times, the corresponding signals from generator 85 represent the derivative of $\theta_m$ or $\dot{\theta}_m$. Now, as will be appreciated from the earlier discussion dealing with the mathematical derivation of the principle made use of by the present system, it will be recalled that the total phase change due to ionospheric refraction is:

$$\frac{K\omega_m r}{cf_0^2} \qquad (18)$$

The derivative of $\theta_m$ is therefore equal to the incremental change of this phase delay. Accordingly, the derivative gives the change of ionospheric refraction index due to change of the target position. Hence, by comparing the derivatives with the spatial position of the target, during a later data reduction stage, it is possible to correlate the incremental changes of the refractive index with changes of the traversed ionosphere, and accordingly, data dealing with the refraction characteristics of the ionosphere may be obtained.

As will be appreciated by those skilled in the art, the particular carrier and range signal frequencies employed, assuming correlation between them, including the return signal frequency from the transponder, are strictly matters of engineering expedience, and other frequency relationships and values could just as well be employed and still achieve the results stated.

It will also be apparent that numerous modifications and changes may be incorporated in the particular arrangement of circuits constituting the system shown and described, and still accomplish the over-all function set forth without involving invention. It is also apparent that each of the circuits shown in block diagrammatic form may take any one of many well-known recognized forms as known in the art and shown in numerous handbooks, technical books, etc., without the employment of invention.

It will be appreciated, of course, that the foregoing disclosure relates only to a detailed preferred embodiment of the invention whose spirit and scope of the invention is set forth in the appended claims.

What is claimed is:

1. An electronic system for correcting the phase delay errors incurred in a range and a carrier signal, where the range signal is modulated on the carrier signal and a portion of their travel occurs in a medium which increases and decreases the phase delay which said range and carrier signals, respectively, would have experienced in traveling through the atmosphere, the amount of said increase and decrease being proportional to their respective frequencies, said system comprising: means for equalizing the frequencies of said range and carrier signals whereby their respective phase delay errors are equal in magnitude but are of opposite sign; and means for equalizing the phases of the range and carrier signals produced by the last-named means whereby the phase delay errors have been eliminated from both signals.

2. A system for correcting the phase delay error incurred in first and second signals traveling through a medium at a velocity other than their normal velocity of travel through the atmosphere, where the first signal is modulated on the second signal and the error is represented by increased and decreased phase delays in said first and second signals, respectively, said system comprising: means for modifying one of said signals such that its frequency corresponds to the frequency of the other signal; means for taking the phase difference between the modified and said other signal; and means for changing the phase of one of said modified or other signals by one-half the phase difference produced by the last-named means whereby the phase delay error in the changed signal has been eliminated.

3. A system for correcting phase errors in a range signal modulated on a carrier signal caused by their travel through the ionosphere, said carrier signal frequency being a multiple of the range signal frequency, said system comprising: dividing means for dividing the carrier signal frequency down to equal the range signal frequency, the ionospheric-induced phase error in said divided carrier signal being equal in magnitude to said range signal phase error but of opposite sign therefrom; and means for adding one-half of the phase difference between said range and said divided carrier signal to said range signal whereby said ionospheric refraction error is eliminated from said range signal.

4. A system for correcting phase errors in a range signal modulated on a carrier signal caused by their travel through the ionosphere, said carrier signal frequency being a multiple of the range signal frequency, said system comprising: frequency dividing means for dividing the carrier signal frequency down to the range signal frequency value, the ionospheric-induced phase error in said divided carrier signal being equal in magnitude to said range signal phase error but of opposite sign therefrom; first means for adding one-half the phase difference between said range and said divided carrier signal to said range signal; and second means for subtracting one-half the phase difference between said range and said divided carrier signal to said divided carrier signal whereby the resulting range and divided carrier signals are identical in phase and have been corrected for ionospheric refraction effects.

5. A system for correcting the ionospheric refraction-induced phase error in a range data signal normally applied to the servo readout portion of a slant range determining system employing phase comparison techniques for tracking a vehicle in the ionosphere, the range data signal initially appearing as a modulation signal on a carrier signal, said correcting system including: means for reducing the carrier signal frequency to where it corresponds to the range data signal frequency; first and second adjustable phase shifting means, each of said phase shifting means being capable of shifting the phase of a passed signal an amount corresponding to its adjustment; means for applying said range data signal and said divided carrier signal to said first and second phase shifting means, respectively; means for adjusting said first and second adjustable phase shifting means such that no phase difference exists between the passed range data and the passed divided carrier signal whereby both of said signals have been corrected for ionospheric refraction effects; and means for applying one of said passed signals as the data signal to said servo readout portion therefor.

6. An electronic measuring system employing phase delay measuring techniques capable of determining the slant range to a vehicle located in the ionosphere without introducing slant range errors due to ionospheric effects, said system comprising: means for producing at least one range signal; means for frequency multiplying said range signal a first predetermined number of times to produce a first carrier signal; means for modulating said range signal on said first carrier signal; means for transmitting the modulated first carrier signal to said moving vehicle; receiver and transmitter means associated with said vehicle for receiving said modulated first carrier signal and retransmitting said range signal moulated on a second carrier signal whose frequency is a second predetermined number of times the frequency of said range signal; means for receiving the modulated second carrier signal transmitted by said receiver and transmitter means; means for demodulating the received modulated second carrier signal to produce a range signal whose phase shift relative to said at least one range signal indicates a greater slant range than the true slant range to said target vehicle owing to ionospheric refraction effects; means for dividing said second carrier signal by said second predetermined number of times to produce a signal whose frequency corresponds to said range signal and whose phase shift relative to said at least one range signal indicates a smaller slant range than the true slant range to said vehicle owing to ionospheric refraction effects, the absolute magnitude between each of the greater and smaller slant ranges indicated by said range and said divided second carrier signals, respectively, and said true slant range being identical; means for effectively taking the difference in slant ranges indicated by said range and said divided carrier signals; and means for effectively subtracting one-half the slant range determined by the last-named means from the slant range determined by said divided carrier signals; and means for effectively said range signal is corrected for ionospheric refraction effects.

7. The electronic system according to claim 6 including, in addition, means for effectively adding one-half of the slant range determined by the last-named means to the slant range determined by said divided second carrier signal whereby the slant range determined by said divided carrier signal is corrected for ionospheric refraction effects.

8. An electronic measuring system employing phase delay measuring techniques capable of determining the slant range to a vehicle located in the ionosphere without introducing slant range errors due to ionospheric effects, said system comprising: means for producing at least one range signal; means for frequency multiplying said range signal a first predetermined number of times to produce a first carrier signal; means for modulating said range signal on said first carrier signal; means for transmitting the modulated first carrier signal to said moving vehicle; receiver and transmitter means associated with said vehicle for receiving said modulated first carrier signal and retransmitting said range signal modulated on a second carrier signal whose frequency is a second predetermined number of times the frequency of said range signal; means for receiving the modulated second carrier signal transmitted by said receiver and transmitter means; demodulating means for demodulating the received modulated second carrier signal to produce a range signal whose phase shift relative to said at least one range signal is a greater phase shift than a phase shift corresponding to true slant range to said target vehicle owing to ionospheric refraction effects, frequency dividing means for dividing said second carrier signal by said second predetermined number of times to produce a signal whose frequency corresponds to said range signal and whose phase shift relative to said at least one range signal is a smaller phase shift than a phase shift corresponding to the true slant range to said vehicle owing to ionospheric refraction effects, the amount the phase shift in said range signal is greater than the phase shift corresponding to true slant range being equal to the amount the phase shift in said divided carrier signal is smaller than the phase shift corresponding to true slant range; first and second actuable phase shifting means associated with said demodulating means and said frequency dividing means, respectively, for shifting the phase of the range signal and said divided carrier signal, respectively, each of said phase shifting means being operable to shift the phase of its corresponding signal an amount corresponding to the amount of its respective actuation; phase difference detecting means responsive to the difference in phase between a pair of applied signals for producing an output actuating signal; means for applying the phase shifted range and divided carrier signal produced by said first and second actuable phase shifting means to said phase difference detecting means; and means for applying the signal produced by said phase difference detecting means to said first and second actuable phase shifting means to reduce the signal produced by said phase difference detecting means to a zero magnitude whereby the phase of the range and divided carrier signals passed through said first and second actuable phase shifting means represents true slant range to said vehicle.

9. An electronic measuring system capable of producing slant range and slant range velocity information of a moving target vehicle, said system comprising: means for generating at least one range signal; means for frequency multiplying said range signal a first predetermined number of times to produce a first carrier signal; means for modulating said range signal on said first carrier signal; means for transmitting the modulated first carrier signal to said moving target vehicle; receiver and transmitter means associated with said target vehicle for receiving said modulated first carrier signal and retransmitting said range signal modulated on a second carrier signal whose frequency is a second predetermined number of times of the frequency of said range signal; means for receiving the modulated second carrier signal transmitted by the receiver and transmitter means associated with said target vehicle; and demodulating means for demodulating the received modulated second carrier signal to produce a range signal whose phase shift relative to said at least one range signal represents slant range information to said target vehicle, the difference in frequency between the received second carrier signal and said predetermined ratio representing the slant range velocity of said moving target vehicle.

References Cited in the file of this patent

UNITED STATES PATENTS

| | | |
|---|---|---|
| 2,134,716 | Gunn | Nov. 1, 1938 |
| 2,654,884 | Palmer | Oct. 6, 1953 |